United States Patent [19]

Polo et al.

[11] 4,238,973
[45] Dec. 16, 1980

[54] FLEXIBLE RECIPROCATING MECHANICAL CONTROL

[76] Inventors: Vincent Polo, 222 N. Ocean Blvd., Delray Beach, Fla. 33444; Sergio R. Panunzio, 36 Hollywood Ct., Rockville Centre, N.Y. 11570

[21] Appl. No.: 867,009

[22] Filed: Jan. 5, 1978

[51] Int. Cl.³ .............................................. F16C 1/10
[52] U.S. Cl. .................................................. 74/501 R
[58] Field of Search ...................... 74/501; 64/23, 23.7

[56] References Cited

U.S. PATENT DOCUMENTS

| | | | |
|---|---|---|---|
| 2,559,292 | 7/1951 | Ferger | 64/23 UX |
| 2,791,894 | 5/1957 | Duckworth | 64/23.7 |
| 3,106,078 | 10/1963 | Turinsky | 64/23 |
| 3,143,867 | 8/1964 | Anderson | 64/23 |
| 3,298,243 | 1/1967 | Geissler et al. | 64/23.7 X |
| 3,449,927 | 6/1969 | Field et al. | 64/23 |
| 3,673,817 | 7/1972 | Doran et al. | 64/23.7 |
| 4,118,078 | 10/1978 | Ernst et al. | 64/23.7 X |
| 4,123,121 | 10/1978 | Ernst et al. | 64/23.7 X |

FOREIGN PATENT DOCUMENTS

| | | | |
|---|---|---|---|
| 723746 | 6/1942 | Fed. Rep. of Germany | 74/501 |
| 339757 | 4/1904 | France | 74/501 |
| 198137 | 5/1923 | United Kingdom | 74/501 |
| 418749 | 10/1934 | United Kingdom | 74/501 |

*Primary Examiner*—Samuel Scott
*Assistant Examiner*—Wesley S. Ratliff, Jr.
*Attorney, Agent, or Firm*—Bauer & Amer

[57] ABSTRACT

A flexible reciprocating mechanical control for actuating a remotely positioned device including a plurality of individual load bearing carriers arranged for movement within a curved housing and joints interposed between the individual carriers to space the carriers from one another and to enable relative pivotal movement therebetween as the control moves within the curved housing.

11 Claims, 16 Drawing Figures

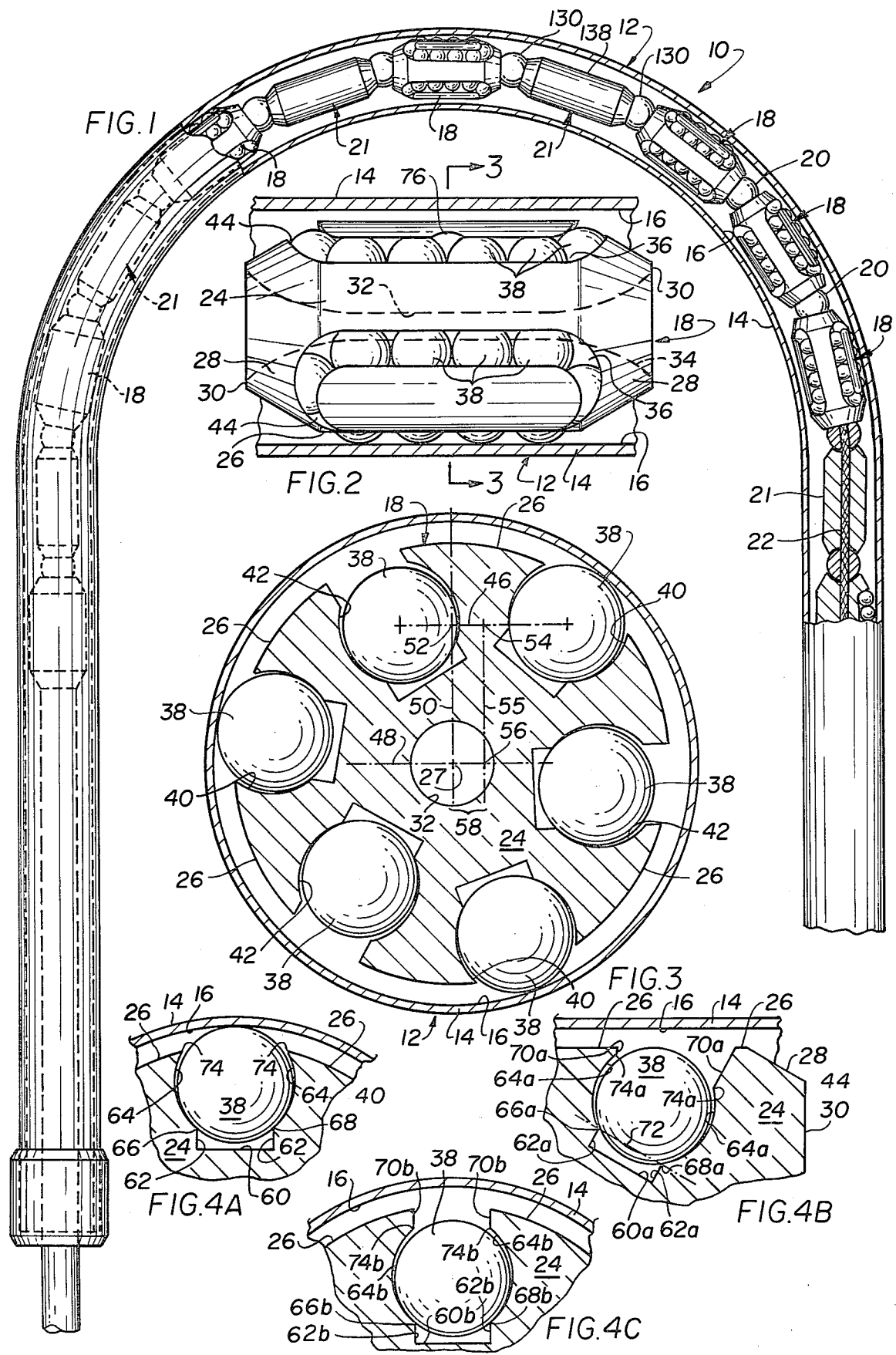

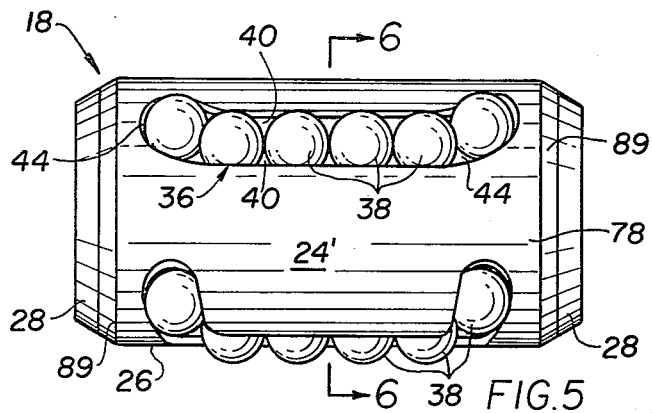
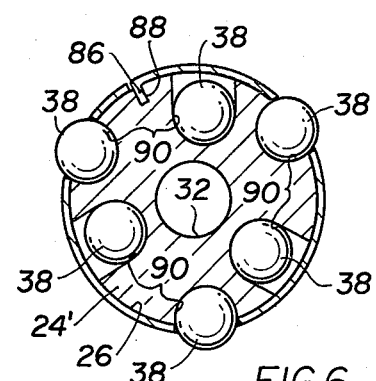
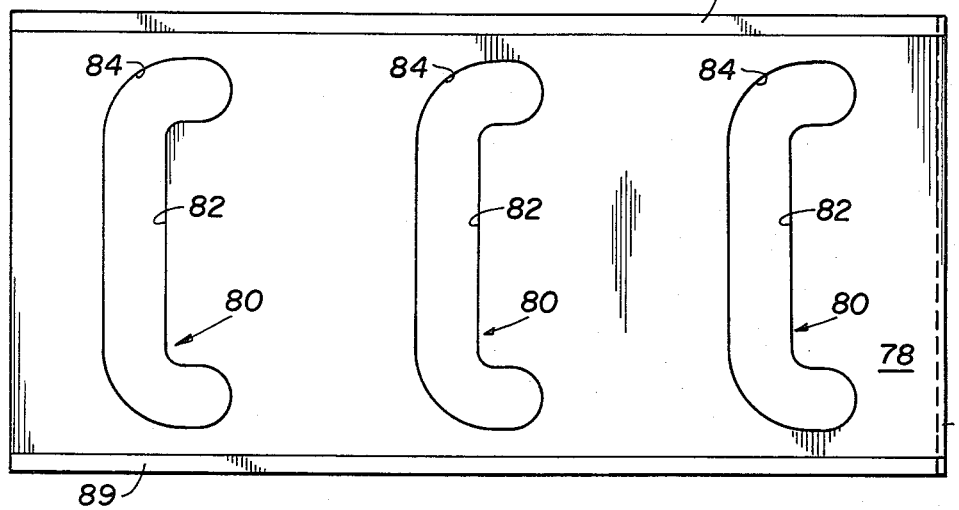
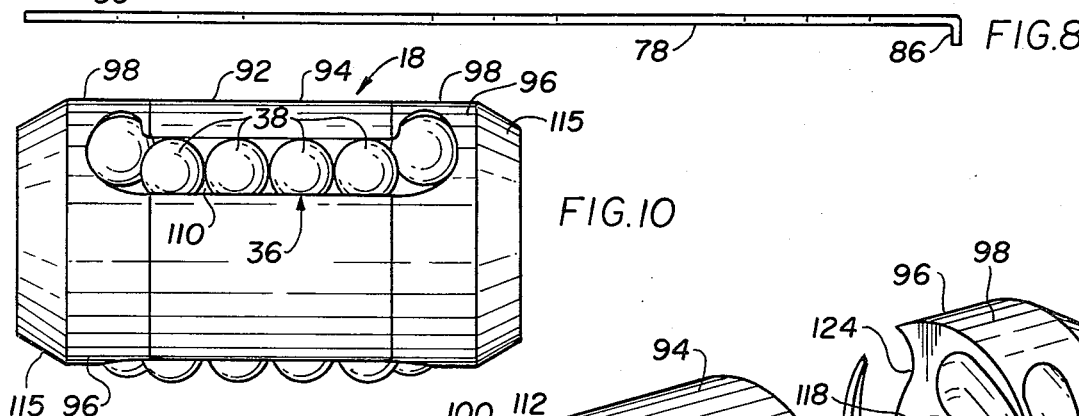
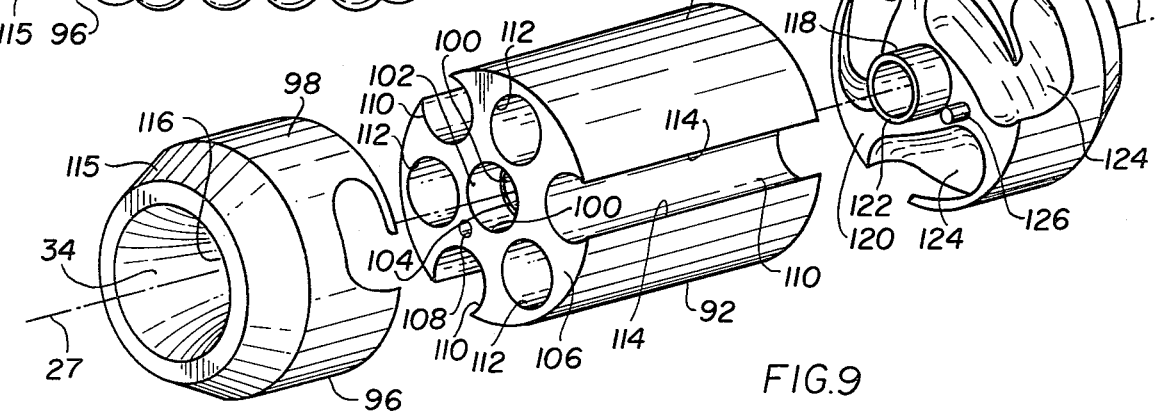

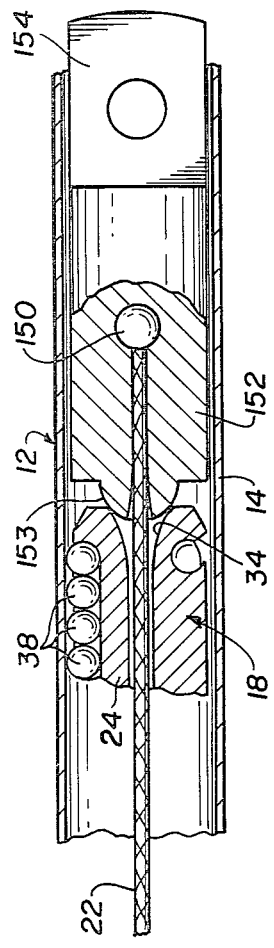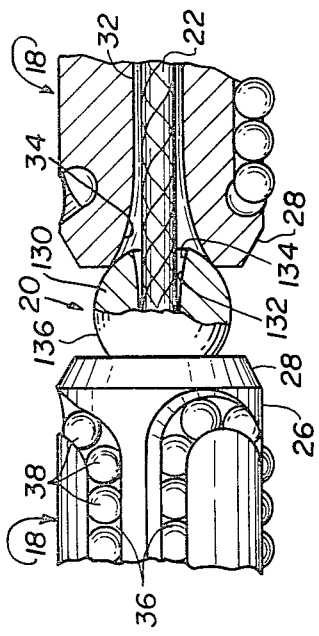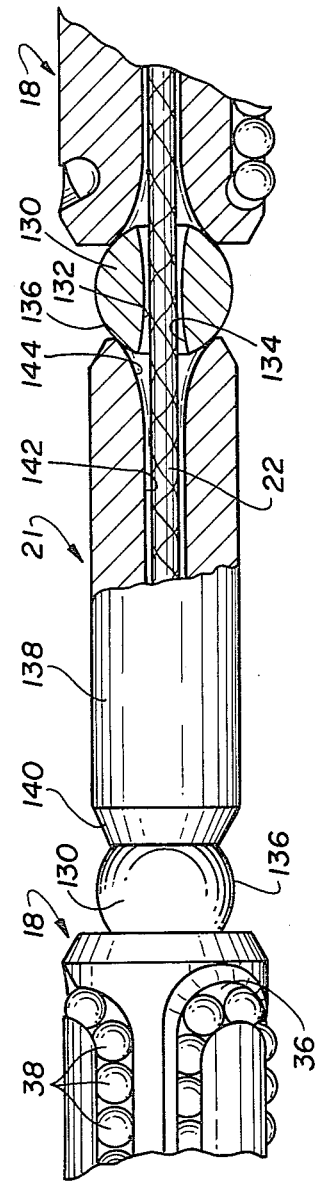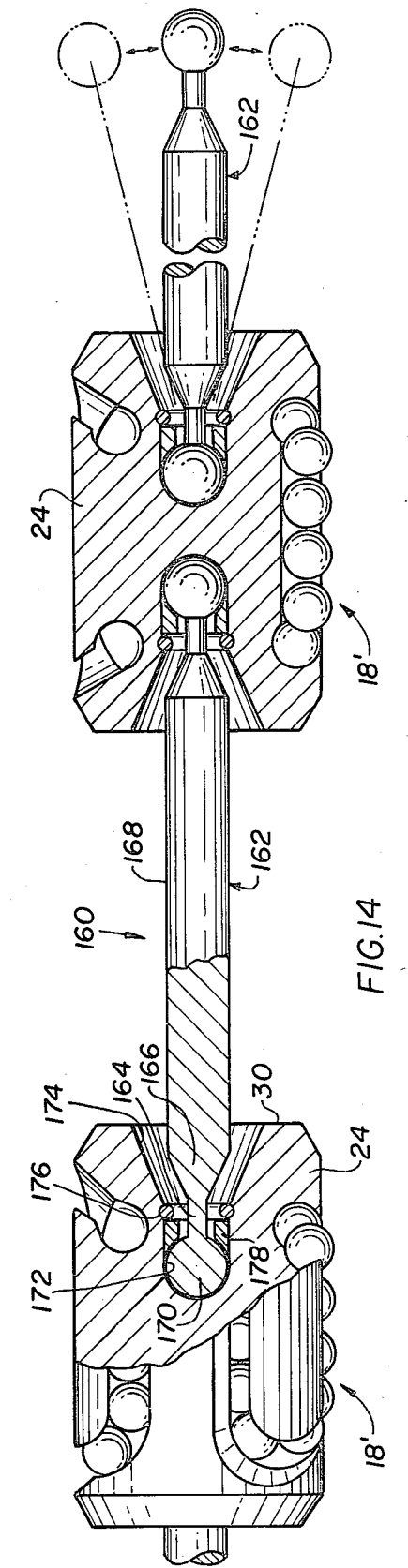
FIG.13
FIG.11
FIG.12
FIG.14

FLEXIBLE RECIPROCATING MECHANICAL CONTROL

This invention relates generally to mechanical reciprocating remote controls, and specifically to such controls which include a plurality of load bearing actuators carrying rollable bearing elements.

In many instances it is necessary to mechanically control a device from a remote location. This has often been done in the past by passing a flexible control cable through a fixed-guide sleeve or sheath so as to enable reciprocating axial movement of the cable within and relative to the sheath. The application of tensile or compressive forces at one end of the cable is thereby transmitted to its opposite end at which the device to be controlled is located.

Such an arrangement suffers from a number of significant drawbacks. Substantial frictional losses result from rubbing of the moving cable against the inner surface or wall of the sheath, necessitating the application of increased control forces and causing accelerating wear of both cable and sheath. Another problem lies in backlash or lost motion which occurs as the cable initially moves transversely against the adjacent interior wall of the sheath in response to an applied axial force, thereby defeating the ability to utilize the cable as a finite and accurate control. These disadvantages become even more significant and problematic where the path through which the sheath guides the control cable is regularly or irregularly curved.

U.S. Pat. No. 3,298,243 to Geissler et al discloses a load-bearing support for a control cable whereby a plurality of such supports or carriers having an axial through bore are strung together along the cable and fixed for movement therewith within a guide sheath. The carriers have convex and concave configured ends for mutual conforming abutment to enable relative pivotal movement therebetween for traversing curved sections of the sheath. Each carrier is further provided on its curved outer surface with at least one endless track or race for supporting and guiding a plurality of rollable bearing elements in circulating movements therealong.

As a result of the varying depth of particular portions of the track, the bearing elements are guided to load bearing and non-load bearing portions relative to the inner surface of the sheath and through curved connecting portions of the track therebetween. Axial movement of the cable effects like movement of the carriers within and relative to the sheath, and the engagement of those rollable bearing elements in load bearing position with the inner surface of the sheath produces the circulating movement of the bearing elements through the track, substantially reducing frictional forces between the carriers and the sheath. Backlash is effectively eliminated since the carriers are sized to place those rollable elements in load bearing position in substantial engagement with the inner wall of the sheath, preventing transverse movement of the carriers relative thereto.

In practice, however, significant frictional losses have been found to occur in the circulation of the rollable bearing elements as the same enter and move through the curved connecting portions of the track. These losses interfere with the efficiency of movements of the carriers relative to the sheath and thereby necessitate that larger tensile and compressive forces be placed on the control cable to actuate the remote device.

Another problem relates to the support of the rollable bearing elements in the endless track. Since the race of the carriers of Geissler et al merely supports the bearing elements therein without providing means for maintaining the same captive, the bearing elements are retained in place only when the carriers are positioned within the sheath; when a carrier is removed from the sheath, the bearing elements are free to drop out of the track and, as can be appreciated, they are easily lost due to their small size and ability to freely roll about. It has been further discovered that the bearing elements are also sometimes prone to disengagement from the track as they enter the curved connecting portions thereof, or as the carrier traverses an extreme curved section of the sheath, or when the bearing elements are in the non-load bearing position in the race.

In addition, although the provision of conforming concave and convex ends on the abutting carriers for enabling pivotal movement therebetween has proved adequate for traversal of relatively gradual curvatures of the sheath, it has been found that this pivot means may not be usable where the sheath includes an extreme curve having a small radius of curvature. In such extreme curves, there is a tendency for interfering contact between adjacent carriers and between the carriers and the sheath, as well as unequal loading of the bearing elements in load bearing position. This may hamper the free and unrestricted movement of the carriers within and relative to the sheath, and require the user to increase the amount of force applied to the cable to actuate the control device.

It is, therefore, the desideratum of the present invention to provide a flexible reciprocating mechanical control that overcomes and provides a solution for the aforementioned problems by the provision of load bearing carriers which function with a minimum of frictional losses and resist jamming or locking so as to permit free and unhampered axial movement of the control with a minimum application of tensile or compressive force.

It is a further object of the present invention to provide a load bearing carrier for use in a mechanical control in which rollable bearing elements are positively retained by the carrier.

It is another object of the present invention to provide means on such carrier to enable the rollable bearing elements to be initially inserted for retention thereby such that the bearing elements are thereafter prevented from escaping by way of the insertion means.

It is still a further object of the present invention to provide an endless track on the carrier for supporting and guiding the rollable bearing elements in circulating movements therethrough whereby the bearing elements experience a minimum of rolling friction as the same traverse the endless track.

It is another object of the present invention to provide a flexible mechanical control comprising a train of load bearing carriers strung on a control cable and arranged for reciprocating axial movement within a curved sheath including joint means between adjacent load bearing carriers to enable relative pivotal movement therebetween as the train traverses portions of the sheath having extreme curves of small radii of curvature.

It is a further object of the present invention to provide such a joint means that eliminates the need to include a control cable extending through the load bearing carriers.

The above description, as well as further objects, features and advantages of the present invention, will be more fully appreciated by reference to the following detailed description of a presently preferred, but nonetheless illustrative, embodiment in accordance with the present invention when taken in conjunction with the accompanying drawings wherein:

FIG. 1 depicts a flexible reciprocating mechanical control constructed according to the teaching of the present invention positioned for axial movement within a guide housing;

FIG. 2 is a side view of a bearing carrier according to the present invention positioned within a partial lengthwise portion of a guide housing;

FIG. 3 is an enlarged cross-sectional view of FIG. 2 taken along the lines 3—3;

FIGS. 4A, 4B and 4C show supported positions of the bearings within the working, feeder and idler portions, respectively, of the endless race defined in the carrier of FIG. 2;

FIG. 5 is a side view of an alternative embodiment of a carrier according to the present invention;

FIG. 6 is a cross-sectional view taken along th lines 6—6 of FIG. 5;

FIG. 7 is a plan view of the development of the bearing retaining sleeve for circumferential positioning about the alternative carrier of FIG. 5;

FIG. 8 is an end view of the sleeve of FIG. 7;

FIG. 9 is an expanded view of still another embodiment of a carrier according to the present invention;

FIG. 10 shows the carrier of FIG. 9 in its assembled form;

FIG. 11 is a side view, partly in section and partly broken away, of a pivotally movable joint interposed between two carriers according to the present invention;

FIG. 12 is a side view, partly in section and partly broken away, of an alternative embodiment of a pivotal joint interposed between two carriers;

FIG. 13 is a sectional view along a portion of the length of a typical means for fixing plural aligned carriers to a desired portion of the control cable; and FIG. 14 is a side view, partly in section and partly broken away, of an universal pivotal joint according to the present invention interposed between two adjacent carriers.

DETAILED DESCRIPTION OF THE PREFERRED EMBODIMENTS

The present invention relates to a flexible reciprocating mechanical control for actuating a remotely positioned workpiece or device (not shown). FIG. 1 shows a mechanical control constructed in accordance with the teaching of the present invention that is generally identified by the reference numeral 10 arranged for axial movement within and along an elongated guide housing such as the sleeve or sheath 12. The sheath 12 is of generally constant cross-section and comprises a substantially circular, continuous bounding wall 14 having an interior surface 16 along which lateral extensions of the control 10 ride in load bearing relation therewith in a manner to be described.

The flexible control 10 moves axially along the sheath 12 in response to the application of tensile or compressive forces exerted on one end of the control, which forces are transmitted therethrough to the remotely positioned device attached to its opposite end for actuating and controlling the workpiece or device. Thus, axial movement of the control 10 may be converted to perform any desired type of working movement at its opposite end. The flexibility of the control 10 enables its use in a housing 12 which includes arcuate or otherwise curved portions. By way of illustration, the housing or sheath 12 which envelops and supports the control 10 and guides the same in reciprocating movement for the transmission of forces therealong is seen in FIG. 1 to include an arcuate portion having a curve that may have a substantially constant radius of curvature. It should, however, be understood that as a consequence of the advantageous design and construction of the control 10 as will be detailed hereinafter, the control 10 is able to traverse sections of a housing or sheath having both regularly and irregularly defined curvatures. In any event, the sheath 12 forms no part of the present invention and the particular configuration thereof with reference to which the inventive mechanical control is described should not be construed as a limitation on the manner of practicing the teachings of this disclosure.

The mechanical control 10 comprises, in combination, a plurality of improved individual load bearing carriers that may be said to be actuators or bearing structures individually and collectively designated 18 arranged to form an elongated train, and joint means linking the carriers to enable flexible push-pull movement of the control 10. The joint means is shown in FIG. 1 to include two embodiments of joint structures generally identified by the numerals 20 and 21 interposed between adjacent carriers 18, and an actuating or control or core cable 22. The joint structures 20 and 21 enable relative universal pivotal movement between the individual carriers 18 as the control 10 traverses an arcuate or curved portion of the sheath 12 and selectively space the individual carriers 18 from one another.

The core cable 22 extends through the individual carriers 18 and the joint structures 20 and 21 to maintain the axial alignment of the various components of the control 10 during linear and pivotal movements thereof. Push-pull forces applied at one end of the control 10 result in reciprocating movement of the core cable 22, through which such forces are transmitted to the remote workpiece. Movement of the cable 22 carriers along with it the carriers 18 and joint structures 20 and 21 for movement within and along the sheath 12 such that the selected spacing between adjacent carriers is maintained during all relative pivotal and linear movements in a manner that will become clear as this description proceeds.

The details of construction of the individual carriers or actuators 18 is shown in FIGS. 2 and 3. The carrier 18 is seen in FIG. 2 to comprise an elongated body 24 of a predetermined length having a substantially circular outer periphery defined by the curved surface 26. A central axis 27 may be defined along the length of and throughout the body 24. The surface 26 may include tapered end portions 28 at the opposite lengthwise bounds thereof which terminate in substantially parallel, reduced diameter end faces 30 at opposite ends of the body 24. A central axial bore 32 is defined longitudinally throughout the length of the carrier body 24 to accommodate the core cable 22 and may include flared portions 34 at either end of the bore 32, each of which opens at its widest point through the end face 30 of the elongated body 24.

Each of the individual carriers 18 further includes on the curved peripheral surface thereof at least one endless track or race generally identified by the general reference numeral 36. In practice, it has been found that the inclusion of three of the races 36 circumferentially spaced about the carrier surface 26 advantageously supports the individual carriers 18 within the sheath 12 in a manner to be described and provides for optimum operational efficiency in utilizing the control 10. The race 36 supports a plurality of rollable bearing elements individually and collectively designated 38 and fill the race 36 throughout the length thereof. As the control 10 moves within the sheath 12, the bearing elements 28 roll to circulate around and along the endless track 36 and are guided in such movement by the defines of the race.

Although the bearing elements 38 are conveniently depicted in the drawings as ball or spherical bearings, it should be understood and will be readily appreciated by those skilled in the art that other rollable structures may function equally as well. However, the ball bearings 38 are utilized in this description since the same are particularly well suited for use with the bearing structure 18 of the present invention and, in conjunction with the drawings, facilitate a full and complete understanding of the operation of the improved load bearing carrier 18 which forms a part of the inventive mechanical control 10.

Each endless track 36 includes a substantially linear or straight working position or segment 40 axially arranged on the carrier surface 26 along at least a portion of the length thereof and a substantially straight idler or drone or return portion 42 on the surface 26 substantially parallel to the working portion 40 and predeterminately spaced therefrom. A pair of curved feeder portions 44 form continuous extensions of and interconnect the working and idler portions 40, 42 to complete the closed loop race 36 and enable the ball bearings 38 to circulate within and along the race. The curved feeder or connecting portions 44 are defined throughout their lengths in a flat plane and as flat planar uninterrupted continuations of the working and idler portions 40, 42 so as to cause the ball bearings 38 to move in a flat plane throughout the endless track 36. The configuration of the race 36 is such that the ball bearings 38 move therealong in a flat plane to provide significant operational advantages, as will be subsequently explained in detail.

Thus, as the ball bearings 38 circulate along the endless track 36, they are guided through the working and idler portions 40, 42 and through the curved connecting portions 44 therebetween. The supported positions of the ball bearings 38 in the working and idler portions 40, 42 may be understood with reference to FIG. 3, which depicts a detailed cross-sectional view of a carrier 18 positioned within the guide sheath 12.

In the working portion 40 of the track 36, bearings 38 are positioned such that the center of each remains within the defines of the race 36 and the carrier body 24 while a portion of the surface of each ball bearing 38 projects out of the race 36 beyond the outer periphery of the carrier body 24. The projecting surface portion of each of the ball bearings 38 positioned in the working portion 40 engages the interior surface 16 of the sheath 12 in load bearing relation therewith. The relative spacing of three complete races 36, and, therefore, of three working portions 40 alternating with a like number of idler portions 42, about the periphery of the carrier body 24 as depicted in FIG. 3 is seen to advantageously support and balance the carrier 18 for load bearing engagement with the sheath 12. Hence, as the carrier 18 is moved axially within the sheath 12, the ball bearings 38 in the working or load bearing portions 40 contact the sheath wall surface 16 to support the body 24 so as to maintain the same laterally spaced equally from the interior defines of the sheath 12.

In the idler or drone portion 42 of the race 36, the ball bearings 38 are recessed within the carrier body 24 to be spaced inward from or toward the curved surface 26 thereof out of load bearing engagement with the interior surface 16 of the sheath 12. As a consequence, the ball bearings 38 are free to idle and perform no work as they move through the drone or non-load bearing portion 42 of the race 36.

The aforementioned flat planar construction of the race 36 serves to define certain geometrical relationships between the working, idler and connecting portions 40, 42 and 44 between those portions and the carrier body 24. In FIG. 3 the broken line 46 represents an imaginary plane extending between the centers of the ball bearings 38 in the working, idler and connecting portions 40, 42 and 44 of the track 36. The broken line 48 defines an imaginary cross-sectional diameter through the carrier body 24 parallel to the line 46. An imaginary radial projection 50 perpendicular to the diameter 48 is seen to intersect the race plane line 46 at a point 52 offset from the midpoint 54 thereof. If a perpendicular imaginary projection 55 is dropped from the midpoint 54 of the line 46 to the diameter 48, it crosses the same at a point 56 that is spaced from the central axis 27.

The working portion 40 is cut by directing the tool perpendicular to the carrier's central axis 27 and then offsetting the tool at an angle between 21° and 25°—and preferably 22.5°—to an offset axis parallel to the central axis 27 and defined by a multiplicity of points 56 spaced therefrom by the offset 58. Hence, the tool cut of the race working segment 40 remains perpendicular to the central axis 27 and thereby raises the balls 38 on the lowermost segment of the working portion 40 into engagement with the surface 16 of the sheath 12.

As the inactive or idler portion 42 of the track 36 is generated, the angle of the cutting tool is perpendicular to the offset axis defined by a multiplicity of points 56 thereby lowering the balls 38 in the idler segment 42 out of engagement with the sheath surface 16.

The size of the spacing or offset 58 of the crossing 56 from the central axis 27 determines the extent to which the load bearing ball bearings 38 in the working portion 40 project beyond the outer periphery of the carrier body 24 and the depth to which the non-load bearing ball bearings 38 in the idler portion 42 are recessed within the body 24. In addition, the offset 58 affects the sharpness or angle of the engagement and disengagement of the bearing elements 38 with the sheath wall surface 16 as the ball bearings 38 are moved into load bearing relation to the sheath 12 as they enter the track working portion 40 and as they are removed from such load bearing relation as they leave the working portion 40. An increase in the offset 58 results in proportionate increases in both the extent of projection of the ball bearings 38 in load bearing position and the recessed depth of the bearings 38 in non-load bearing position. A variation in the offset 58 so as to increase or decrease the same must result in a proportionate decrease or increase, respectively, of the angle between the imaginary radial projection 50 and an imaginary line connecting the center of a bearing 38 in the working segment 40 and the carrier central axis 27.

Reference is now made to FIGS. 4A, 4B and 4C which detail the cross-sectional geometry of the defines of the race 36 and the positioning of the race portions 40, 42, 44 relative to the carrier surface 26. In the working portion 40, shown in FIG. 4A, the bearing elements 38 are raised into physical contact for load bearing engagement with the sheath wall 16. To so position the balls 38 relative to the surrounding sheath surface 16, the defines of the race 36 in the working segment 40 include a substantially flat bottom surface 60 and upstanding shoulders 62 supported by and contiguous with the lateral edges thereof. The shoulders 62 terminate in semi-circular arcuate faces 64 substantially conforming in size and curvature to that of the outer periphery of the ball bearings 38 so as to enable the same to non-frictionally and guidedly roll along the working portion 40 freely, unrestricted and unhampered and without excessive lateral motion. At their outer edges, the arcuate faces 64 meet the curved outer surface 26 of carrier body 24.

Still referring to FIG. 4A, the shoulders 62 and arcuate faces 64 merge at support or contact points 66, 68 to form edges upon which the bearing elements 38 rest as the same traverse the working segment 40, in a manner similar to the support of a train by the rails of a railroad track. The load bearing engagement of each ball bearing 38 with the sheath wall 14 is transmitted through the bearing 38 to the support points 66, 68. This load constitutes the only significant force acting on each of the bearing elements 38 in the working portion 40 and, as a result of the symmetric configuration of the working segment cross-section shown, whereby the edges 66, 68 are substantially equally spaced from the outer surface 26 of the carrier body 24, the above-mentioned loading force is substantially evenly distributed on the two support edges 66, 68.

In the idler portion 42, depicted in cross-section in FIG. 4C wherein like reference numerals further incorporating the letter "b" have been employed to designate elements similar to those described above with regard to FIG. 4A, the bearing elements 38 are supportedly positioned out of load bearing engagement or contact with the sheath 12. Thus, the only significant forces acting on the support edges 66b, 68b as the ball bearings 38 move along the idler section 42 are those resulting from contact of the bearings 38 with the defines of the race idler portion 42, as for example the semi-circular arcuate faces 64b, and the weight of the bearings 38 due to the gravitational pull on the mass thereof. For practical purposes, this mass is insignificant relative to the loading forces present on the bearings in the working segment 40. As described with regard to FIG. 4A, the support edges 66b, 68b in the idler portion 42 are substantially equally spaced from the carrier body outer surface 26 to evenly distribute these small loading forces between the two edges 66b, 68b. The idler portion 42 also includes the shoulders 70b connecting the arcuate faces 66b and the carrier surface 26 so as to recess the bearing elements 38 within the carrier body 24 and out of load bearing engagement with the surrounding sheath wall 16.

As they move through the curved connecting or feeder portions 44 of the race 36, a substantial centrifugal force acts on each of the bearing elements 38. This centrifugal force is directed tangentially outward of the curvature of the feeder portion 44 and parallel to the plane of the race 36. In addition, a bearing load acting on each ball bearing 38 is directed substantially radially into the carrier body 24 as a result of the contact of the bearing element 38 with the sheath wall 16 as the bearing 38 moves into contact with the sheath wall 16 as it leaves the feeder portion 44 or is removed from engagement with the wall surface 16 as it enters the curved portion 44.

Specifically, and by way of illustration, each ball bearing 38 in the working segment 40 is positioned in load bearing engagement with the sheath wall 16 and, as a result of such load bearing engagement, includes a substantially radially-directed component of force acting thereon which is distributed between the race support edges 66, 68. As the bearing 38 first enters the curved connecting portion 44 from the working segment 40, it initially remains in contact with the sheath wall 16 and, therefore, in addition to the tangentially-directed centrifugal force component due to its movement in the curved portion 44, the bearing 38 carries a substantially radially-directed component of force. Moving further into the feeder portion 44, the bearing 38 becomes gradually and smoothly disengaged from contact with the sheath wall 16 in a manner to be described. After such disengagement, the only loading component remaining on the ball 38 as it continues around the curved portion 44 is that due to the tangentially-directed centrifugal force acting thereon.

In order to minimize frictional interference with the movement of each ball bearing 38 as the same rolls through the curved connecting portions 44, the geometry of the race 36 in said curved portions 44, and particularly of the points at which the bearings 38 are supported therein, may be configured so as to take into account the centrifugal force acting on the bearings 38. Thus, FIG. 4B depicts the cross-sectional configuration of the race 36 in the connecting portion 44 wherein the support edge 66a is positioned closer to the carrier outer surface 26 than the support edge 68a. As shown, the loading force on the bearing 38 has virtually no radial component of force acting thereon since the bearing is unloaded from the sheath wall 16, but it has a substantial tangential component due to the centrifugal force acting on the ball 38 as a result of the curvature of its path.

As previously noted, the curved feeder portions 44 form smooth continuations of the working and idler segments 40 and 42 to interconnect the same and there-together define a flat plane throughout and along which the bearing elements 38 circulate. This may be better understood with reference to FIG. 3. A center or axis of each ball bearing 38 may be defined at the point of intersection of any two or more diameters thereof. The flat plane along which the bearings 38 roll is depicted in FIG. 3 by the imaginary race plane line 46. That is, the center or axis of each ball bearing 38 moves in a flat plane defined by the imaginary line 46. Hence, although the feeder portion bearing support edges or points 66a, 68a through which the imaginary rolling axis 72 is depicted in FIG. 4B support the bearings 38 at an angle relative to the equivalent support edges 66, 68 in the working segment (FIG. 4A) and the edges 66b, 68b in the idler segment (FIG. 4C) of the race 36, the centers of the ball bearings 38 while the same move in the curved feeder portions 44 remain at all times in the flat race plane 46.

The effect of providing a single, flat plane along which the bearing elements 38 roll is increased stability of the same as they enter and move through the curved feeder or connecting portions 44. This increased stability tends to substantially avoid the disengagement and loss of the bearing elements 38 from the race feeder portions 44 which was found to be a problem with prior art carriers, thus aiding in maintaining the bearing elements 38 captive within the race 36 as the bearings move between the working and idler segments 40 and 42.

The defines of the race 36 is selectively configured to render the bearing elements 38 captive as the same circulate therein. The ability to captively retain the bearings 38 to the carrier body 24 and, more specifically, within the endless track 36, enables each carrier 18 to be initially and permanently supplied and assembled with the required member of bearings 38 to fill the race 36. The carrier 18 can thereafter be handled as an independent mechanical unit and tested or used as such in conjunction with a housing 12 or the like without the possibility of inadvertent loss of the bearing elements 38 from within the carrier body 24.

The bearing-retaining configuration of the race 36 may be seen in FIGS. 4A, 4B and 4C. In the working or loadbearing segment 40 shown in FIG. 4A, the edges 74 defined by the merger of the arcuate faces 64 with the carrier surface 26 form retaining lips which bound an open gap therebetween narrower than the diameter of the ball bearings 38. The bearings 38 are unable to pass through the gap between the lips 74 although each can project a portion of its surface through the gap and into load bearing contact or engagement with the sheath wall 16, and their escape from the working segment 40 of the race 36 is, therefore, prevented.

In the curved connecting or feeder portions 44, the retaining lips 74a are shown recessed within the carrier body 24 and spaced from the outer surface 26 by the shoulders 70a in FIG. 4B. The lengths of the shoulders 70a, which determine the depth of the said recess, are selected to maintain the bearing elements 38 out of contact with the surrounding sheath wall 16 in non-load bearing relation therewith. In the feeder portions 44 extending from the ends of the load bearing segment 40, the retaining lips 74a, which are initially contiguous with the carrier surface 26, are smoothly and gradually recessed as the lengths of the shoulders 70a increase to a selected height sufficient to remove the bearings 38 from engagement with the sheath 12. In this way, the bearing elements 38 leaving the working portion 40 are actively disengaged from load bearing contact with the sheath wall 16 by the gradual recession of a narrow space between the curved connecting portion 44 which capture and retain the bearings 38 within the carrier body 24.

The narrow spaced retaining lips 74b are similarly recessed a predetermined amount by the selected sizing of the shoulders 70b in the idler portion 42 seen in FIG. 4C. Thus, the bearing elements 38 are effectively maintained within the carrier body 24 out of load bearing engagement with the sheath wall 16 as they move along the idler segment 44.

An entry notch 76, best seen in FIG. 2, is defined in one of the retaining lips 74 of the working segment 40 intermediate the axially-spaced ends thereof. The notch 76 is sized to sufficiently increase the gap between the confrontingly positioned lips 74 so as to enable the bearing elements 38 to pass therethrough and into the segment 40 to fill the length of the race 36. The sizing of the entry notch 76 is preferably selected to permit the bearings 38 to frictionally contact the defines of the notch 76 and the confrontingly opposed edge 74 as the ball bearings 38 are forced into and within the race 36 for captured retention thereby. After all the bearings 38 fill the race 36, the size of the entry notch 76 may be made slightly smaller by indenting the same such as by tapping the material adjacent to the notch or other deforming structure.

The positioning of the entry notch 76 on the high side lip 74 of the working segment 40 prevents the escape of the bearing elements 38 through the notch 76 when the carrier 18 is operationally positioned for use. When the carrier 18 is positioned for axial movement in the sheath 12, the bearings 38 in the working portion 40 are placed in load bearing contact with the sheath wall 16. The force on the ball bearings 38 resulting from such load bearing contact is directed into the interior of the carrier body 24 and distributed between the support edges 66, 68. As a result of this inwardly directed force, the bearings 38 are held on the support edges 66, 68 and effectively maintained out of contact with the retaining lips 74 along the length of the working segment 40. They are, therefore, unable to pass back out through the notch 76 between the opposed lips 74 and escape from their captured position within the race 36.

When the carrier 18 is removed from within the sheath 12, the bearing elements 38 are prevented from inadvertently escaping from the track 36 through the said notch-expanded inter-lip gap due to the abovementioned frictional contact resulting from the selective sizing of the notch 76. However, the bearings 38 may be removed from captured relation within the race 36 by lightly forcing the same back out through the entry notch 76 in any appropriate manner.

Alternative means for retaining the bearing elements 38 captive within the endless track 36 is shown in FIGS. 5 through 8. In this second embodiment of the carrier 18, shown cross-sectionally in FIG. 6, a retaining sleeve 78 is individually and separately fabricated and thereafter circumferentially positioned in encircling relation on the outer surface 26 of the carrier body 24'. The body 24' substantially conforms structurally to the carrier body 24 of FIG. 2 discussed hereinabove and carries at least one endless track 36 positioned on the outer periphery thereof, although three tracks 36 are shown in the drawing.

As detailed in the development of FIG. 7, the retaining sleeve 78 is of generally rectangular cross-sectional shape and includes a selectively configured opening or slot generally designated 80 for each endless track 38 provided on the carrier body 24'. Each of the slots 80 comprises a substantially straight portion or segment 82 transversely oriented relative to the elongation of the sleeve 78 and a curved portion 84 extending from each of the ends of the straight segment 82 and terminating substantially perpendicular thereto. The straight segments 82 of the openings 80 are selectively spaced from one another along the length of the sleeve 78 so as to place the segments 82 atop and along the load bearing or working portions 40 of the races 36 when the sleeve 78 is encirclingly positioned on the carrier surface 26.

The length of the elongation of the retaining sleeve 78 is selectively chosen to enable the sleeve 78 to completely encircle the surface 26 of the carrier body 24. A projection or key 86 depends from one end of said elongation in a direction substantially perpendicular to the plane of the sleeve 78, as shown in FIG. 8. The projection 86 engages a slot or keyway 88 defined on the carrier body surface 26 along at least a portion of the length thereof to immovably locate the sleeve 78 on the carrier body 24' and prevent relative shifting or sliding therebetween. The width of the sleeve 78 may similarly be selectively chosen to enable the edges 89 to extend partially over the carrier tapered surface portions 28 when the sleeve 78 is encirclingly positioned about the carrier body 24'. Therefore, once the sleeve 78 is circumferentially positioned about the carrier surface 26 so that the straight segments 82 of the openings 80 are in register with the track working portions 40 and the curved portions 84 are correspondingly aligned over the race feeder portions 44, the engagement of the sleeve key 86 with the carrier keyway 88 insures the maintenance of the relative position of the retaining sleeve 78 relative to the carrier body 24'.

The width of the opening 80 is selectively sized smaller than the diameter of the ball bearings 38 which circulate in and throughout the endless track 36, in the same manner that the retaining lips 74 previously described bound a narrow gap therebetween to retain the bearings 38 captive within the carrier body 24. Thus, each of the bearing elements 38 in the working segment 40 is able to project a portion of its surface through the opening 80 into load bearing contact or engagement with the sheath wall 16, but is prevented from escaping from within the working segment 40 through the opening 80 as a result of the selective narrow sizing of the width of the opening 80. Since the surface of the sleeve 78 covers and completely closes the race idler segment 42, the bearing elements 38 are similarly prevented from escaping therefrom.

It can, therefore, be appreciated that the use of a retaining sleeve 78 circumferentially positioned about and atop the curved carrier surface 26 results in a cooperative arrangement whereby the bearing elements 38, which circulate along and throughout the race 36, are maintained captive within the defines of the race and are prevented from escaping therefrom. The sleeve 78 may be fabricated from any convenient material, such as tampered steel, plastic or the like, which is sufficiently flexible to enable the same to be bent into encircling relation about the carrier body surface 26 and to remain so bent but sufficiently rigid to prevent the bearing elements 38 from escaping through the opening 80 by forcefully deforming the width of the opening 80 during utilization of the control 10 in a manner to be described. The sleeve 80 may be affixed to the carrier body 24 by the use of an adhesive to bond the same to the curved surface 26 or in any other appropriate manner by which the sleeve 78 is immovably and non-rotatively positioned on the surface 26.

It should be noted that the defines of the race 36 of the carrier body 24' shown in FIG. 6 provide a continuous curved or arcuate supporting surface 90 in the working, idler and connecting segments 40, 42 and 44. In such an arrangement, the forces acting on the bearings 38 are distributed throughout the curved support surface 90, rather than merely between the supporting edges 66, 68 of the carrier embodiment of FIGS. 2 through 4. However, it should be apparent to those skilled in the art that either of the illustrated configurations of the defines of the race 36 may be employed in constructing any of the carrier embodiments taught herein.

A further modification of the carrier 18 is shown in FIGS. 9 and 10. Referring to FIG. 9, it can be seen that this embodiment of the carrier 18 is a multi-element assembly which comprises an elongated tubular body 92 having a selectively sized, substantially curved outer peripheral surface 94, and a pair of end cap members 96 having conformingly curved and sized outer surfaces 98. The body 92 is provided in the direction of the elongation thereof with a central axial throughbore 100 of a selected diameter sufficient to accommodate the control cable 22 therethrough. The central bore 100 may include enlarged-diameter portions 102 adjacent the ends thereof which are connected with the central portion of the bore 100 by shoulders 104. The end faces 106 of the body 92 lie substantially perpendicular to the outer peripheral surface 94 and can be seen in FIG. 9 to have defined therein a small aperture or guide-way 108 which extends axially a short distance into the body 92 and which is predeterminately positioned radially outward of the defines of the central bore 100.

At least one working segment and one idler segment are defined in the elongated body 92. Still referring to FIG. 9, wherein three of each of the said segments are included, the working or load bearing segment comprises an arcuate groove 110 defined in the outer surface 94 of the body 92 along and throughout the length thereof. The idler or non-load bearing segment is seen to comprise a cross-sectionally circular passage 112 defined parallel to the groove 110 within the body 92 and inwardly spaced or recessed from the outer surface 94 thereof. The curvature of the groove 110 and the diameter of the passage 112 are sized slightly larger than the corresponding dimension of the ball bearings 38 to enable the latter to roll within and along each in a free and unrestricted manner. The edges or lips 114 of the working segment groove 110 are formed by the merger of the defines of the groove 110 with the body surface 94. The space between the lips 114 is narrowed to advantageously render the bearing elements 38 captive when the same are positioned for movement within the groove 110 in the same manner as described hereinabove with respect to the carrier embodiment of FIGS. 2 through 4.

Each of the end cap members 96 is provided with a tapered surface portion 115 adjacent one of the end surfaces thereof and a central throughbore 116 having a diameter substantially equal to that of the central portion of the bore 100 extending through the body 92. A circular collar 118 which includes an extension of the throughbore 116 axially defined therethrough projects from the central portion of a substantially flat end face 120 of the member 96. The outer diameter of the collar 118 is sized to substantially conform to that of the enlarged portion 102 of the tubular body central bore 100. In addition, the thickness of the wall 122 is substantially the same as the size of the shoulder 104. This selective sizing of the collar 118 facilitates the attachment of the end caps 96 and the elongated body 92 in a manner to be described.

Each end cap 96 further includes a feeder portion in the end face 120 thereof for each pair of working and idler segments provided in the body 92. The feeder portion comprises an elongated cavity or hollow 124 defined in the end face 120 which gradually and smoothly extends more deeply into the end face 120 proximate its central portion than at its ends. A guide pin or finger 126 projects normally from the end face 120 in a predetermined location radially outwardly offset from the collar 118 to mate with the guide aperture. The length of the finger 126 substantially conforms to the depth of the guideway 108 in the body 92.

The illustration of FIG. 9 is merely intended for the purpose of enabling a facile description of this embodiment of the invention. In practice, the end cap members 96 may be foreshortened and parts of the feeder portion cavities 124 thereshown may actually be formed by casting, molding, or other appropriate processes as continuations of their respective passages 110 and 112 as part of the opposite ends of the body 92. Hence, the illustration shown in FIG. 9 is not to be deemed to constitute a limitation on the intended scope of the invention.

To assemble the modified carrier 18 of FIG. 9, the collar 118 of each end cap member 96 is inserted into one of the enlarged-diameter portions 102 of the tubular body throughbore 100 until the end wall 122 of the collar 118 abuts the shoulder 104 and the guide pins 126 fit into and mate with their positioning apertures 108 to align the portions 124 with their respective grooves 110 and passages 112. At this point, the end faces 106, 120 of the body 92 and end caps 96 respectively will similarly be positioned in contiguous abutting relation to each other. The relative sizing of the enlarged bore portions 102 and of the collars 118 may be so selected to provide a frictional engagement therebetween to facilitate the completion of a tight and secure coupling of the end cap members 97 to the tubular body 92. An adhesive or the like can be utilized between the end faces 106, 120 in addition to the aforesaid frictional engagement, or in lieu thereof, to insure a permanent bond between the body 92 and end caps 96.

When the end cap members 96 are abuttingly positioned adjacent the end faces 106 of the body 92, the cavities 124 constituting the feeder portions of the race 36 are aligned with the corresponding working and idler segments 110, 112 to interconnect the same and form continuous planar extensions thereof. As previously noted with reference to the above-disclosed embodiments, the bearing elements 38 are guided by and along the race 36 for circulating movement therethrough along a single, flat plane. The construction and characteristics of the single, flat plane substantially conform to that described with regard to the carrier embodiment of FIGS. 2-4, and therefore will not be repeated.

The body guideway 108 and the end cap finger 126 are predeterminately relatively positioned on their respective end faces 106, 120 for coupled engagement with one another when the end caps 96 are mounted on the body 92. This coupled engagement insures a proper alignment of each of the feeder portions 124 with its respective working and idler segments 110, 112 so as to complete a smooth, endless race 36 about which the bearing elements 38 may rollingly circulate for load bearing and non-load bearing engagement with the sheath wall 16.

It can, therefore, be appreciated that the coupling of the end cap members 96 with the tubular body 92 results in the formation of a unitary carrier 18 as seen in FIG. 10, as if the same were initially integrally fabricated as a single unit. The arrangement and details of construction of the completed unitary carrier 18 of FIG. 10 are substantially like those of the carrier 18 of FIGS. 2 through 4, and utilization and operation of the various embodiments of the carrier 18 is independent of the particular method by which the same is constructed.

To form the reciprocating control 10, the carriers 18 are positioned with the sheath 12 axially aligned relative to one another to form a train. The control cable 22 is threaded through the central axial bore in each of the carriers 18 to maintain them in alignment and to laterally space the same equally from the sheath 12.

In order to enable the train of carriers 18 to traverse curved portions of the sheath 12, means for facilitating pivotal movement between adjacent ones of the carriers must be provided. Such pivotting or joint means may take the form shown in FIG. 11, generally designated by the reference numeral 20.

The joint means 20 comprises a spherical or ball-like body 130 which includes a passage or bore 132 defined therethrough along a diameter thereof. The passage 132 is predeterminately sized to accommodate the control cable 22 therethrough and for this purpose may conveniently conform to the sizing of the carrier central bore 32. The passage 132 may include flared portions 134 adjacent its ends.

The spherical body 130 is positioned for use between adjacent ones of the axially aligned carriers 18 in abutting relation therewith. A portion of the outer surface 136 of the spherical body 130 extends into the flared portion 34 of the carrier body central axial bore 32 and abuts the defines of the flared portion 34. It can, therefore, be appreciated that as the train of carriers 18 traverses a curved portion of the sheath 12, the spherical body 130 and the adjacent carriers 18 in abutment therewith pivot or rotate relative to one another. The cooperative receipt of a portion of the spherical body outer surface 136 within the flared portion 34 of the carrier central axial bore 32 facilitates such pivotal movement between the carriers 18 and the joint body 130. The flared portions 134, 34 enable transverse movement of the cable 22 relative to the body 130 and the carrier 18 respectively as the same relatively pivot during traversal of a curved portion of the sheath 12.

The spherical body 130 is selectively sized so as to space the same from the sheath wall 16 and out of load bearing engagement therewith. Thus, the diameter of the body 130 is preferably less than that of the individual carrier member 18. On the other hand, the body 130 should be larger than the widest dimension of the flared portion 34 of the carrier bore 32, so as to prevent the ball 130 from completely entering the flared portion 34. Between these two extremes, the sizing of the body 130 may be selectively chosen to separate the adjacent carriers 18 by a predetermined amount. Clearly, the further a portion of the spherical body outer surface 136 extends into the flared portion 34 of the carrier bore 32, the smaller will be the spacing between the adjacent carriers 18 on opposite sides of the spherical body 130.

Another embodiment of a pivot or joint means for interposition between adjacent carriers 18 is depicted in FIG. 12 and is designated by the general reference numeral 21. The joint means 21 comprises a pair of spherical bodies 130, each of which is structurally indistinguishable from that described with regard to FIG. 11, and an elongated, rod-like spacer 138 axially interposed in abutting relation therebetween.

The spacer 138 may have a substantially circular cross-sectional configuration as shown including tapered end surface portions 140, although the actual shape of the periphery of the spacer 138 is of minimal importance and the same may assume any convenient cross-sectional configuration. A passage or bore 142 longitudinally defined through the spacer 138 is provided with flared portions 144 adjacent the ends thereof for cooperatively and abuttedly receiving therein a portion of the outer surface 136 of each of the spherical bodies 130 so as to facilitate relative pivotal movement between the bodies 130 and the spacer 138 as the combination traverses a curved portion of the sheath 12.

The spacer 138 is selectively cross-sectionally sized to position the same in the sheath 12 laterally remote and spaced from the interior wall surface 16 thereof and out of load bearing engagement therewith in both straight and curved portions of the sheath 12. The length of the spacer 138 is similarly selected to predeterminately space, in conjunction with the pair of abutting spherical bodies 130, the adjacent carrier member 18 from one another between which the joint 21 is abuttingly positioned.

In use, the joint means 21 is interposed between a pair of adjacent individual carrier members 18 and the control cable 22 is threaded therethrough to maintain the axial alignment of each of the component parts of the control 10 during operation thereof. As the carriers 18 and the interposed joint means 21 are moved along curved portions of the sheath 12, the adjacent carriers 18 and the spacers 138 pivot relative to the spherical bodies therebetween. It should be understood that while the use of a single spherical body 130 between a pair of adjacent individual carrier members 18 as described above will enable the carriers to traverse a portion of the sheath 12 having an extremely small radius of curvature, the addition of a second spherical body 130 and of a spacer 138 interposed between the two bodies 130, as shown in FIG. 12, enables the construction of a control 10 utilizing fewer carriers 18 and, therefore, less costly to fabricate but decreases the traversable degree of sheath curvature of the resulting control 10 if the spacers 138 are of a length greater than that of the carriers 18. Thus, the use of one or the other of the joint means 20, 21 will depend to some extent upon the degree of curvature required to be traversed by the sheath 12. It should be further understood that a particular control 10 may include both of the joint means 20 and 21 along various sections or segments of the sheath 12 where the same is irregularly and variably curved at different portions thereof.

To retain the carriers 18 fixed to the desired portion of the control cable 22 and prevent the cable 22 from axially moving relative to the carriers 18 strung thereon, appropriate means may be provided on the cable 22. Thus, by way of example, FIG. 13 shows an enlargement 150 that may be affixed to the cable 22 or formed integral therewith at each end thereof or inwardly spaced therefrom. The enlargement 150 is secured in an extension arm 152 which includes a spherical portion 153 at one end thereof for abutment with the carrier bore flared portion 34 and that may have tensile or compressive forces applied thereto at its opposite end 154. Thus, the carriers 18 and the joint means 20 and/or 21 are abuttingly confined between the extension arms 152 at opposite ends of the control cable 22 such that axial movement of the cable 22 carries with it like movement of the carriers 18 and the spacing between adjacent carriers 18 as a result of the interposed joint means 20, 21 remains constant during operation of the control.

Yet another embodiment of a joint or pivot means is shown in FIG. 14 and designated 160. As will become clear, use of the universal joint means 160 obviates the need for utilizing a control cable in conjunction with the train of carriers 18. The universal joint means 160 may be formed as a single, integral unit including an elongated, rigid spacer body 162 which may have the substantially cross-sectional configuration seen in FIG. 14. The spacer 162 is provided with reduced diameter extensions 164 proximate the ends thereof and frustoconical tapered portions intermediate the central portion 168 of the spacer body 162 and the extensions 164 thereof to connect the same and to provide a gradual reduction of the diameter of the body 162 therebetween. Each of the extensions 164 carries on the end thereof a substantially spherical swivel body 170.

Still referring to FIG. 14, it can be seen that the carrier of FIGS. 2 through 4 has been modified to accommodate the universal joint means 160. In particular, the modified carrier 18' includes, in lieu of the central axial throughbore 32, a cavity axially extending less than halfway into the carrier body 24 and comprising a substantially constant diameter passage 172 inwardly spaced from the carrier end face 30 and connected therewith by a frustoconical flared opening 174. The diameter of the passage 172 is selectively sized to conform to that of the swivel body 170, the passage 172 further including an annular groove or channel 176 defined in the bounds thereof.

In the operation of prior art push-pull controls, it has been found that as a portion of the control traverses a point of curvature transition of the sheath—i.e. moving from a straight segment of the sheath to a curved segment or from one curved segment to a segment of a different direction or degree of curvature—the tensile or compressive force transmitted along the length of the control tends to create an upturning movement on one or more of the carriers resulting in transverse, rather than axial, movement at one of the ends of the affected carrier. A carrier so affected may be described as literally pivoting about a point axially intermediate its ends. This upturning movement creates an anomalous and uneven transmission of forces from the sheath to the bearing elements in land bearing position. As a result, some of the bearing elements can become overloaded with respect to the normal conditions of operation wherein the loading forces from the sheath are substantially evenly distributed among the bearings in the load bearing or working segment of the track. Moreover, as a result of compressive forces transmitted between adjacent carriers, the elastic system formed by the cooperating bearing elements and sheath can become unstable, destroying the utility of the control as a precision, relatively frictionless, mechanical remote controller.

The present invention, and in particular the combination of the universal joint means 160 with the carriers 18', overcomes this problem by utilizing the discovering that if the point of pivotal movement between adjacent carriers or between a carrier and its adjacent, abutting joint means is brought closer to the center of the carrier body—i.e. closer to the point equidistant between the lengthwise terminations of the carrier member—the upturning moment appearing during the traversal of sheath transitions is greatly reduced or effectively eliminated. The carrier can, therefore, be designed to comply with required stability conditions throughout the range of forces transmitted by the control. Thus, the depth to which the passage 172 axially extends into the carrier body 24 is selectively chosen to take into account the range of forces to be transmitted by the control 10. The closer to the axial center of the carrier body 24 that the passage 172 extends, the smaller the upturning turning forces will be on a carrier 18' traversing a sheath curvature transition portion.

To connect the universal joint means 160 to an individual carrier member 18', one of the joint swivel bodies 170 is axially inserted into the passage 172 as shown in FIG. 14. The relative selected sizing of the passage 172 and each swivel body 170 enables the latter to freely rotate and pivot within the defines of the former. An annular bushing 178 is next positioned abuttingly adjacent the swivel body 170 in the passage 172, and a snap-on or C-ring 180 or other appropriate means is fitted within the groove or channel 176 to retain the bushing 178 and the swivel body 170 rotatively captive within the passage 172 to prevent their escape therefrom. By so coupling the universal joint means 160 between a pair of adjacent carrier members 18', it can be appreciated that reciprocating movement exerted on the control 10 from one of the ends thereof will carry with it each of the carriers 18' in fixed, spaced relation with one another by virtue of the spaced connections therebetween via the universal joint means 160.

As discussed hereinabove with regard to prior embodiments of the control 10, the train consisting of carries 18' and interposed universal joint means 160 is positioned within a sheath 12 for reciprocating axial movement therealong. In traversing a curved portion of the sheath 12, the universal joint means 160 enables relative pivotal movement between the adjacent carriers 18', the frustoconical opening 174 permitting relative pivotal displacement between the spacer body 162 and the carrier body 24. The selective sizing of the length of the spacer body 162 permits the adjacent carriers 18' to be separated by a predetermined distance and enables the design of a control 10 or a portion thereof having the ability to traverse curved segments of a sheath 12 having various degrees of curvature. It should be clear that the shorter the length of the spacer body 162, the greater the curvature of the sheath 12 that the control will be able to traverse.

While there have been shown and described and pointed out the fundamental novel features of the invention as applied to a preferred embodiment thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. In a reciprocating mechanical control for axial movement within a housing of a selected cross-sectional configuration, said control comprising:
   a plurality of carrier members having a curved peripheral surface, each of said carriers including a plurality of tracks on the peripheral surface thereof, said plurality of tracks each being an endless track carrying rollable bearing elements which move in said respective track through load bearing and non-load bearing positions and therebetween in a single plane, said load bearing and non-load bearing positions being substantially parallel and each of said tracks being positioned on the peripheral surface of each said carrier so that a radius of the carrier perpendicular to a line defined perpendicular to and connecting said load bearing and non-load bearing positions intersects said line at a point thereon other than at the midpoint of said line, whereby said rollable bearing elements in said load bearing position cooperate with the housing to support and guide said carriers for axial movement in the housing:
   joint means for interposition between adjacent carriers to space the same from one another and to enable pivoted relative movement therebetween, said joint means being laterally spaced from the defines of the housing to position said joint means for non-frictional axial movement relative to the housing,
   each said endless track comprising a working portion to position the bearing elements in their load bearing position with a surface of each of the bearing elements projecting beyond the periphery of said carrier member for engagement with the defines of the housing,
   an idler portion to position the bearing elements in their non-load bearing position with the surfaces of the bearing elements withdrawn within said carrier member spaced from the periphery thereof and out of engagement with the housing,
   and interconnecting portions forming continuous extensions of said working and idler portions to complete each said endless track to enable circulating movement of the rollable bearing elements endlessly along said track.

2. In a reciprocating mechanical control according to claim 1, said carrier members further comprising means thereon for maintaining the rollable bearing elements captive in each said track as the bearing elements move therein through said load bearing and non-load bearing positions and therebetween.

3. A flexible train of load-bearing carriers for axial movement within a sheath, comprising:
   a plurality of individual carrier members each having a substantially circular periphery, at least an endless track on said periphery and carrying rollable bearing elements for circulating movement therealong, and means on said carrier members for maintaining said bearing elements captive in said track, said endless track including a working portion wherein a portion of each of said rollable bearing elements projects beyond the perihery of said carrier for load-bearing engagement with the sheath, an idler portion wherein said rollable bearing elements are recessed within said carrier member and withdrawn from the periphery thereof to maintain said bearing elements out of load-bearing engagement with the sheath, and connecting portions for feeding said circulating rollable bearing elements between said working and idler portions, said portions all being in the same plane such that the rollable bearing elements move throughout said endless track in a single plane, and said working and idler portions of said track being substantially parallel and positioned on said carrier periphery so that a radius of the carrier perpendicular to a line defined perpendicular to and connecting said working and idler portions intersects said line at a point thereon other than at the midpoint of said line;
   and joint means interposed between adjacent ones of said individual carrier members to maintain therebetween a selected relative spacing and to enable relative pivotal movement of said adjacent carrier members as the train moves axially within the sheath.

4. A train of load bearing carriers according to claim 3, including an entry notch defined in said endless track to enable the bearing elements to be positioned in said track for captured circulating movement therein, said notch being defined in said working portion of said track whereby the load bearing engagement of the bearing elements with the sheath as the bearing elements move in said working portion prevents the escape of the bearing elements through said entry notch.

5. A mechanical push-pull control for axial movement within a sheath, comprising:

a plurality of elongated carrier members each including a curved outer periphery and at least an endless track on the outer periphery thereof;

a plurality of spherically-shaped rollable bearing elements filling the full length of said endless track for guided movement in said track through load bearing and non-load bearing positions, and means on said carrier members for preventing the escape of said bearing elements from said endless track;

said track forming a planar closed loop path including a working portion for load bearing positioning of said bearing elements wherein the same project beyond the periphery of said carrier member, an idler portion for non-load bearing positioning of said bearing elements wherein the same are positioned remote and inwardly spaced from the carrier periphery, and intermediate connecting portions forming continuous extensions of said working and idler portions to circulate said bearing elements therebetween, and said working and idler portions of said track being substantially parallel and positioned on each said carrier member so that a radius of the carrier perpendicular to a line defined perpendicular to and connecting said working and idler portions intersects said line at a point thereon other than at a midpoint of said line;

joint means axially interposed between adjacent ones of said individual carrier members and including spacing means for maintaining a selected separation between adjacent carriers irrespective of push-pull movement of the control, and arcuate swivel means abutting said individual carrier members for enabling relative pivotal movement between said individual carrier members and adjoining joint means, said joint means being laterally spaced from the defines of the sheath for non-frictional axial movement therein, and each of said individual carrier members including an entry notch positioned on the working portion of said endless track for enabling the initial placement of the rollable bearing elements through said notch during operation of the control as a result of the load bearing relation of the bearing elements with the sheath while the bearing elements are in said working portion of said track.

6. A mechanical push-pull control according to claim 5 means on each of said individual carrier members to prevent the escape from said endless track of said bearing elements as the same circulate along said endless track.

7. A load-bearing carrier comprising:
an elongated member having a curved periphery;
a closed loop path on said member including load bearing and non-load bearing portions extending along the length thereof, each said portion providing a respective path for bearing elements movable therealong such that the bearing elements in said load bearing portion are always in load bearing position and bearing elements in said non-load bearing portion are always in non-load bearing position, and curved end portions connecting said load and non-load bearing portions to enable bearing elements to move in said path between said load bearing and non-load bearing portions, said portions being in a single plane;

and a plurality of spherical bearing elements movable in said closed loop path, said path supporting the spherical bearing elements for movement in said single plane as the same move in said load bearing, non-load bearing and curved connecting portions of said closed loop path, wherein said load bearing portion of said closed loop path comprises a first substantially straight leg thereof and said non-load bearing portion comprises a second substantially straight leg thereof positioned on said elongated member substantially parallel to said first leg and spaced therefrom by said curved connecting end portions to complete said closed loop path, wherein a line may be defined perpendicular to and connecting said first and second legs so that a radius of said elongated member defined perpendicular to said line intersects the same at a point on said line other than at its midpoint, and an entry notch defined in said load bearing portion to enable the insertion of the spherical bearing elements into said closed loop path for captured movement therein and to prevent their escape therefrom.

8. A load-bearing carrier according to claim 7 and further comprising means on said member for retaining the spherical bearing elements captive so as to prevent their escape from said closed loop path as the bearing elements move therealong.

9. A train of actuators capable of traversing a sheath having a curved path and having rollable bearing elements for movement therein, each of said actuators comprising:

a curved member having an axis extending longitudinally therethrough;

an endless track predeterminately defined in said member and including a load bearing portion, a substantially parallel non-load bearing portion and connecting paths therebetween for movement of the bearing elements in said track;

said load bearing portion being positioned so as to project a surface of each of said rollable bearing elements beyond the load bearing portion of said curved member for load bearing engagement with the curved path of the sheath;

said non-load bearing portion being recessed within the member such that the surfaces of the bearing elements are withdrawn from the surface of and within the curved member and out of load bearing engagement with the curved path of the sheath;

and said connecting paths forming continuous extensions of said load bearing and non-load bearing portions and being defined throughout their lengths in a flat plane as flat planar continuations of the load bearing and non-load bearing portions so as to cause the bearing elements to move in a flat plane within and between the load bearing and the non-load bearing portions throughout the full extent of said endless track, and means on said member for capturing the bearing elements within the bounds of said endless track and for preventing their escape therefrom as the bearing elements move along said load bearing and non-load bearing portions and said connecting paths, wherein a line may be defined perpendicular to and connecting said substantially parallel load bearing and non-load bearing portions of said track so that a radius of said curved member defined perpendicular to said line intersects the same at a point on said line other than at its midpoint for predeterminately defining said track in said curved member.

10. An actuator according to claim 9, further comprising an entry notch defined in said load bearing portion to enable the introduction of the rollable bearing elements into said track through said notch, whereby the location of said entry notch in said load bearing portion prevents the escape of the bearing elements from the track through said notch due to the load bearing engagement of the bearing elements with the curved path when the bearing elements are positioned adjacent said entry notch.

11. An actuator according to claim 10, said means for capturing the bearing elements comprising a lip on at least a portion of the defines of said endless track.

* * * * *